April 21, 1953
J. E. BENJAMIN
2,635,726
DOUBLE REVERSING CLUTCH
Filed Feb. 15, 1951
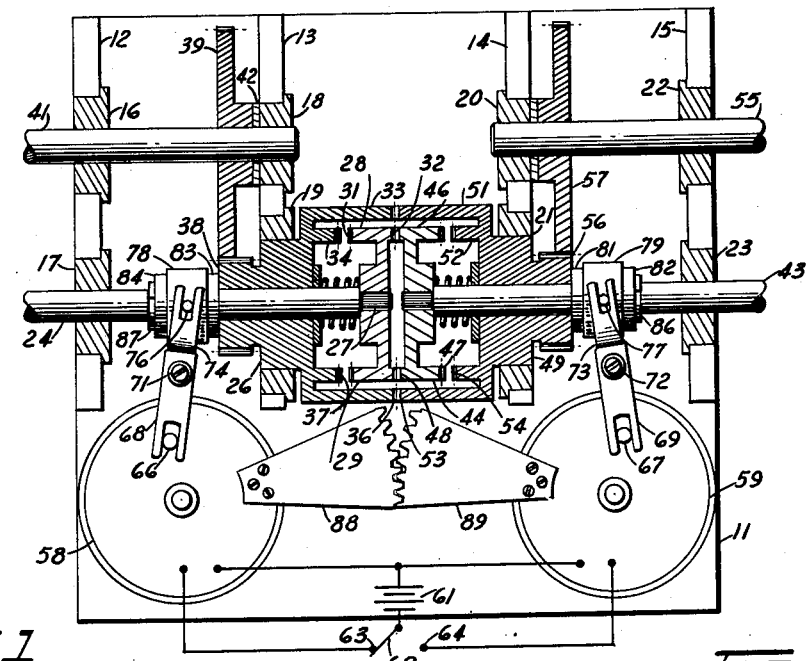
Fig 1
Fig 3
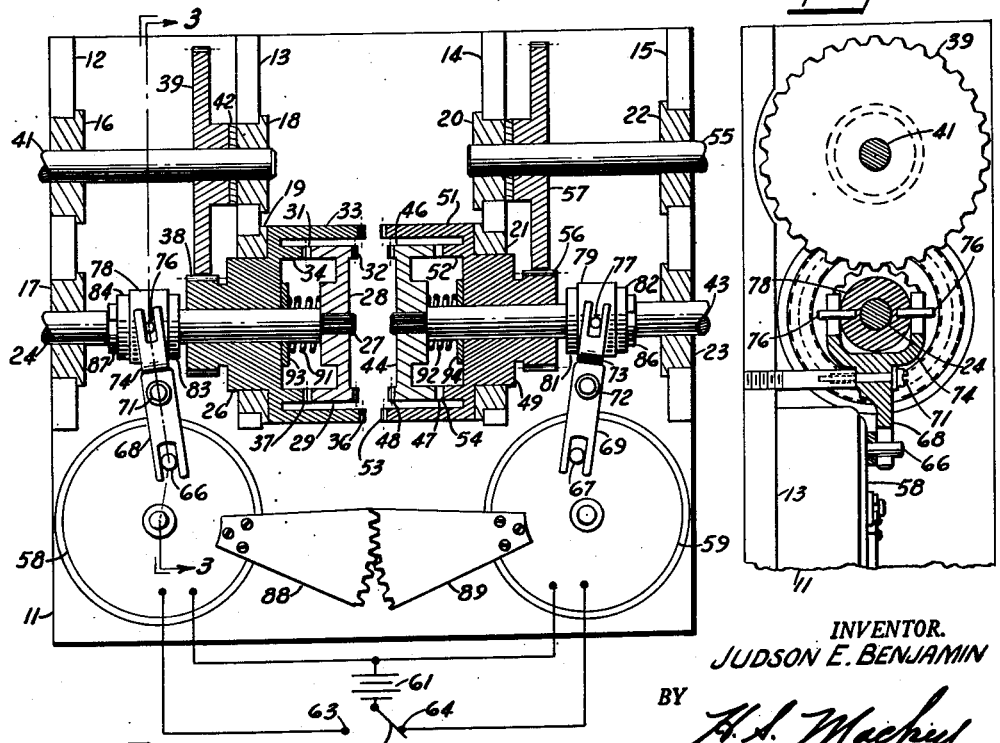
Fig 2
INVENTOR.
JUDSON E. BENJAMIN
BY
H. A. Mackey
ATTORNEY.

Patented Apr. 21, 1953

2,635,726

UNITED STATES PATENT OFFICE 2,635,726

DOUBLE REVERSING CLUTCH

Judson E. Benjamin, White Plains, N. Y., assignor to General Precision Laboratory Incorporated, a corporation of New York Application February 15, 1951, Serial No. 211,109

6 Claims. (Cl. 192—51)

This invention relates to a clutch mechanism wherein the interconnections between a pair of input shafts and a pair of output shafts may be reversed by a simple clutch shifting arrangement. More specifically the instant invention pertains to a clutch mechanism wherein the alternate operation of a single device serves to directly connect or cross connect a pair of input shafts to a pair of output shafts.

In computing mechanisms and the like it is frequently desirable to be able to reverse the rotational interrelations between a pair of input shafts and a pair of output shafts, that is, to provide the mechanical counterpart of an electrical reversing switch. In the past such reversal of mechanical interrelations between input and output has necessitated the use of four separate clutches either operated separately or interconnected by various cumbersome and complicated arrangements to insure the proper combination of shifting movements.

The instant invention has for its purpose the provision of a simple, economical and compact arrangement for accomplishing this shift of mechanical connection between inputs and outputs.

Another purpose of the invention is to provide such an arrangement whereby the shifting of interconnections between the inputs and outputs is positively accomplished by the operation of a single element in either one of two alternate positions.

In general these purposes are accomplished by providing a pair of double faced clutch members rotatably enclosed in a pair of cage members each of which is also provided with a pair of clutch faces with means for longitudinally shifting the clutch and cage members so that in one position the clutch members and the cage members are engaged with each other while in the alternative position the respective clutch members are each engaged with a respective cage member.

A further understanding of the invention may be had from the following detailed description considered together with the accompanying drawings in which:

Figure 1 is a sectional view of an embodiment of the invention illustrated in one position of its operation.

Figure 2 is a similar sectional view of the invention in its other position of operation and, Figure 3 is a section taken on the line 3—3 of Fig. 2.

Referring now to Fig. 1 a frame 11 is provided with suitable wall portions 12, 13, 14 and 15 into which are press fitted or otherwise affixed bearings 16, 17, 18, 19, 20, 21, 22 and 23. An input shaft 24 is journalled in the bearing 17 and has rotatably mounted thereon a cage member 26 which in turn is rotatably journalled in the bearing 19.

The end of the shaft 24 interiorly of the cage member 26 has splined thereto at 27, a clutch member 28 provided with a rim 29, the inner and outer edges of which have clutch teeth 31 and 32 formed thereon.

The cage member 26, at the end adjacent the end of the shaft 24 is provided with a pair of concentric annular extensions 33 and 34, the outer annular extension 33 projecting for a greater longitudinal distance than the inner annular extension 34 so that the circumferential faces thereof are axially displaced with respect to each other. Each of these axially displaced faces is provided with clutch teeth 36 and 37 which cooperate with clutch teeth formed on other elements of the mechanism in a manner as will be described hereinafter.

The other end of the cage member 26 is provided with a spur gear 38 meshing with a gear 39 affixed to an output shaft 41 journalled in bearings 16 and 18, a suitable thrust bearing washer 42 being positioned between the hub of the gear 39 and the bearing 18.

A second output shaft 43 is similar in construction and mounting to the input shaft 24, being journalled similarly in a bearing 23 and having splined to its end a clutch member 44 which, like the clutch member 28, is provided with a rim 46 the inner and outer edges of which are provided with oppositely extending clutch teeth 47 and 48. Similarly there is rotatably mounted on the shaft 43 a cage member 49 which in turn is journalled in the bearing 21.

The cage member 49 is to all intents and purposes a duplicate of the cage member 26 being provided with concentric annular extensions 51 and 52 on each of which is formed clutch teeth 53 and 54. Likewise the other end of the cage member 49 bears a spur gear 56 meshing with a gear 57 affixed to a second input shaft 55 journalled in bearings 20 and 22.

The shafts 24 and 43 and their associated clutch elements 28 and 46 as well as the cage members 26 and 49 are shifted longitudinally to provide the proper clutch engaging actions by means of a pair of rotary electromagnets 58 and 59 which may be alternately energized from a potential source indicated by the battery 61 through actuation of the single pole double throw switch 62. Each of the electromagnets 58 and 59 is provided with a stud 66 and 67 engaging in a slot provided in the end of a lever 68 or 69, the lever 68 being pivoted at 71 while the lever 69 is pivoted at 72. The upper ends of each of the levers 68 and 69 are provided with U-shaped arm portions 73 and 74 provided with slotted end portions which engage trunnions 76 and 77 affixed to collars 78 and 79 loosely mounted on shafts 24 and 43 respectively.

The collars 78 and 79 are constrained from outward longitudinal movement with respect to the respective shafts 24 and 43 on which they are mounted by split rings 86 and 87 contained in annular grooves formed in the respective shafts and act on inward movement against the cage members 26 and 49 to force them toward each other.

Each of the rotary electromagnets 58 and 59 has fastened thereto a gear segment 88 and 89 the teeth of which are engaged so that rotary operation of either electromagnet when energized from the source 61 results in rotation of the other electromagnet in the opposite direction.

In the illustration of Fig. 1 the rotational movement is to be transmitted from the input shaft 24 to the output shaft 43, while the second rotational movement is to be transmitted from the input shaft 55 to the output shaft 41. In this figure the switch 62 is caused to engage contact 63 energizing electromagnet 58 which causes its rotor to be moved in a counterclockwise direction. At the same time the electromagnet 59 is rotated in a clockwise direction through the engaged gear segments 88 and 89. Thus pin 66 is moved to the left and pin 67 to the right causing the collars 78 and 79 to push the cages 26 and 49 towards each other through action of the shift levers 68 and 69. At the same time springs 91 and 92 press clutches 28 and 46 into engagement which results in shafts 24 and 43 being moved toward each other.

By this action the clutch teeth 32 and 48 are engaged and rotational movement is transmitted from the shaft 24 to the shaft 43. At the same time the conjoint movement of the clutch collars 78 and 79 forces the cage members 26 and 49 toward each other as a result of the collars 83 and 81 bearing respectively against their respective end faces. Consequently, clutch teeth 36 and 53 are engaged so that rotational movement is transmitted from the input shaft 55, through gears 57 and 56, cage members 49 and 26 and gears 38 and 39 to the second output shaft 41.

In Fig. 2 the various parts are illustrated in the positions they occupy when the mechanism is shifted to transmit motion from the input shaft 24 to the output shaft 41 and from the input shaft 55 to the output shaft 43.

In this cross-over shifted position, the switch 62 is engaged with contact 64 to energize the rotary electromagnet 59 causing it to rotate in a counterclockwise direction. At the same time the electromagnet 58 is rotated in a clockwise direction by means of the engaged gear segments 88 and 89. This opposite rotation of electromagnets 58 and 59 results in the shafts 24 and 43 being moved away from each other through the shifting action of the shift levers 68 and 69 and clutch collars 78 and 79.

This opposite movement of the shafts 24 and 43 disengages clutch teeth 32 and 48 and causes the teeth 31 on the clutch member 28 to engage the teeth 37 of the cage member 26. At the same time the teeth 47 on the clutch member 44 are caused to engage the teeth 54 on the cage member 49. Thus in this position rotary movement is transmitted from the input shaft 24 through clutch disc 28, cage member 26, gears 38 and 39 to output shaft 41 on the one hand and from input shaft 55 through gears 57 and 56, cage member 49 and clutch disc 44 to output shaft 43 on the other hand.

It will be apparent that in shifting from the position of Fig. 1 to that of Fig. 2 the teeth 36 and 53 on the respective cage members 26 and 49 must be disengaged before teeth 31 and 37 and teeth 47 and 54 are engaged to prevent interference. To this end springs 91 and 92 bearing against thrust washers 93 and 94 are respectively inserted between the clutch disc 28 and cage member 26 and the clutch disc 44 and cage member 49 so that longitudinal motion is transmitted to the cage members 26 and 49 by the movement of shafts 24 and 43 away from each other prior to the engagement of a respective clutch disc and respective cage member.

While in describing the mechanism of the invention the various clutch faces have been referred to as being provided with clutch engaging teeth it will be understood by one skilled in the art that friction surfaces may be utilized if desired. Teeth are, however, preferred because of their more positive engagement. Likewise it will of course be appreciated that the inputs and outputs may be reversed and the shafts 41 and 43 made inputs whence the shafts 24 and 55 become outputs, the selection of the shafts which are to be made inputs and outputs being a mere matter of choice.

What is claimed is:

1. A double clutch mechanism comprising, a first shaft, a first clutch member affixed to one end thereof, a second shaft, a second clutch member affixed to one end of said second shaft, said first and second clutch members being axially aligned and having first clutch faces disposed for mutual cooperation, a third clutch member loosely mounted on said first shaft having a cup portion enclosing said first clutch member, a fourth clutch member loosely mounted on said second shaft having a cup portion enclosing said second clutch member, the cup portion of said third and fourth clutch members each being provided on their outer edges with first clutch faces disposed for mutual cooperation, second clutch faces positioned interiorly of said cup portions disposed for mutual respective cooperation with second clutch faces provided on said first and second clutch members, a third shaft rotatably connected to said third clutch member, a fourth shaft rotatably connected to said fourth clutch member, and means for displacing said first and third clutch members longitudinally with respect to each other and with respect to said second and fourth clutch members.

2. A double clutch mechanism as defined in claim 1 in which said last named means includes mutually interconnected members operative to move said first and second shafts in opposite longitudinal directions.

3. A double reversing clutch as defined in claim 2 in which said first and third and said second and fourth clutch members are resiliently connected for simultaneous longitudinal movement.

4. A double clutch mechanism comprising, a pair of axially aligned shafts, a first clutch member fastened to the end of one of said shafts, a second clutch member fastened to the adjacent end of the other of said shafts, said first and second clutch members being each provided with first clutch faces disposed in opposed relation for mutual engagement, a third clutch member, means supporting said third clutch member on one of said shafts for rotatable and longitudinal movement with respect thereto, a fourth clutch member, means for supporting said fourth clutch member on the other of said shafts for rotatable and longitudinal movement with respect thereto, said third and fourth clutch members being provided with first clutch faces disposed in opposed relation for mutual engagement, second clutch faces on said first and third clutch members disposed in opposed relation for mutual engagement, second clutch faces on said second and fourth clutch members disposed in opposed relation for mutual engagement, means for moving said clutch members axially relative to each other, means for limiting the relative axial movement of said third and fourth clutch members to less than the relative axial movement of said first and second clutch members, and a second pair of shafts rotatably coupled respectively to said third and fourth clutch members.

5. A double clutch mechanism comprising, a pair of axially aligned shafts, a first disc clutch member fastened to the end of one of said shafts, a second disc clutch member fastened to the adjacent end of the other of said shafts, said first and second disc clutch members being each provided with first and second clutch faces lying in spaced planes normal to the axes of said shafts, said first clutch faces being disposed in opposed relation for mutual engagement, a third clutch member having a portion enclosing said first disc clutch member, means for supporting said third clutch member on one of said shafts for rotatable and longitudinal movement with respect thereto, a fourth clutch member having a portion enclosing said second disc clutch member, means for supporting said fourth clutch member on the other of said shafts for rotatable and longitudinal movement with respect thereto, the portions of said third and fourth clutch members enclosing said first and second disc clutch members being each provided with first opposed clutch faces for mutual engagement, said third clutch member being provided with a second clutch face internally of said enclosed portion positioned in opposed relation to the second clutch face of said first disc clutch member, said fourth clutch member being provided with a second clutch face internally of said enclosed portion positioned in opposed relation to the second clutch face of said second disc clutch member, means for moving all of said clutch members axially relative to each other, means for limiting the axial movement of said third and fourth clutch members to less than the relative axial movement of said first and second disc clutch members, and a second pair of shafts rotatably coupled respectively to said third and fourth clutch members.

6. A double clutch mechanism comprising, a pair of axially aligned shafts, a first clutch member fastened to the end of one of said shafts, a second clutch member fastened to the adjacent end of the other of said shafts, said first and second clutch members being each provided with first clutch faces disposed in opposed relation for mutual engagement, a third clutch member, means for supporting said third clutch member on said one shaft for rotatable and longitudinal movement with respect thereto, said third clutch member being provided with a longitudinally extending portion surrounding said first clutch member, a fourth clutch member, means for supporting said fourth clutch member on said other shaft for rotatable and longitudinal movement with respect thereto, said fourth clutch member being provided with a longitudinal extending portion surrounding said second clutch member, said longitudinally extending portions being provided with oppositely disposed first clutch faces positioned for mutual engagement, second clutch faces internally of said longitudinally extending portions positioned for mutual engagement with corresponding second clutch faces provided on said first and second clutch members, means for moving said clutch members axially relative to each other, means for limiting the relative axial movement of said third and fourth clutch members to less than the relative axial movement of said first and second clutch members, and a second pair of shafts rotatably coupled respectively to said third and fourth clutch members.

JUDSON E. BENJAMIN.

References Cited in the file of this patent

FOREIGN PATENTS

| Number | Country | Date |
|---|---|---|
| 279,499 | Great Britain | June 28, 1928 |